W. T. NEWMAN.
PNEUMATIC WHEEL.
APPLICATION FILED DEC. 30, 1910. RENEWED NOV. 10, 1915.
1,195,148.
Patented Aug. 15, 1916.
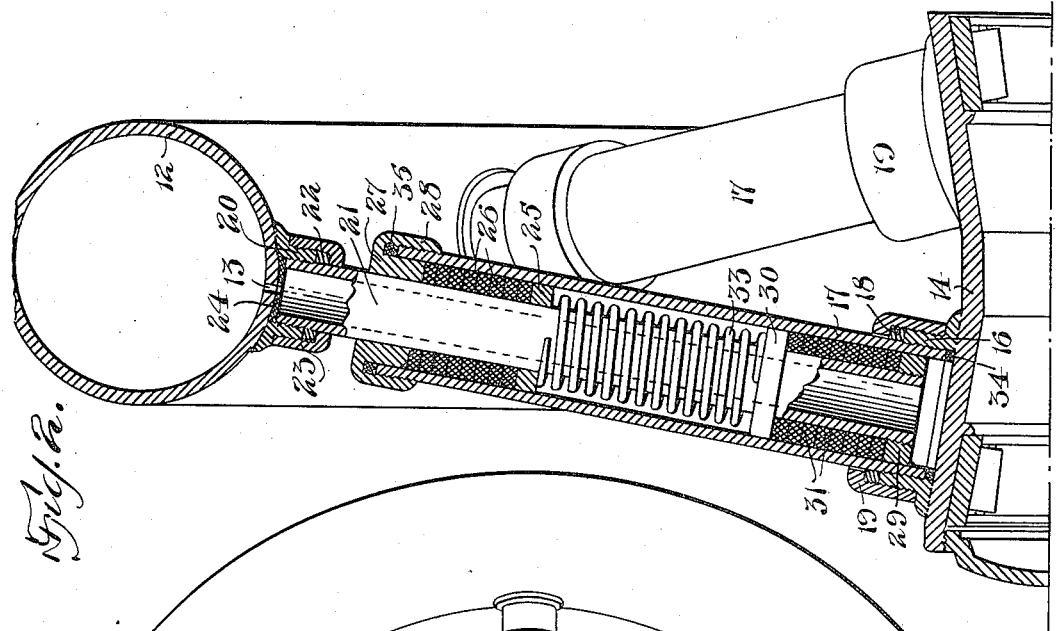
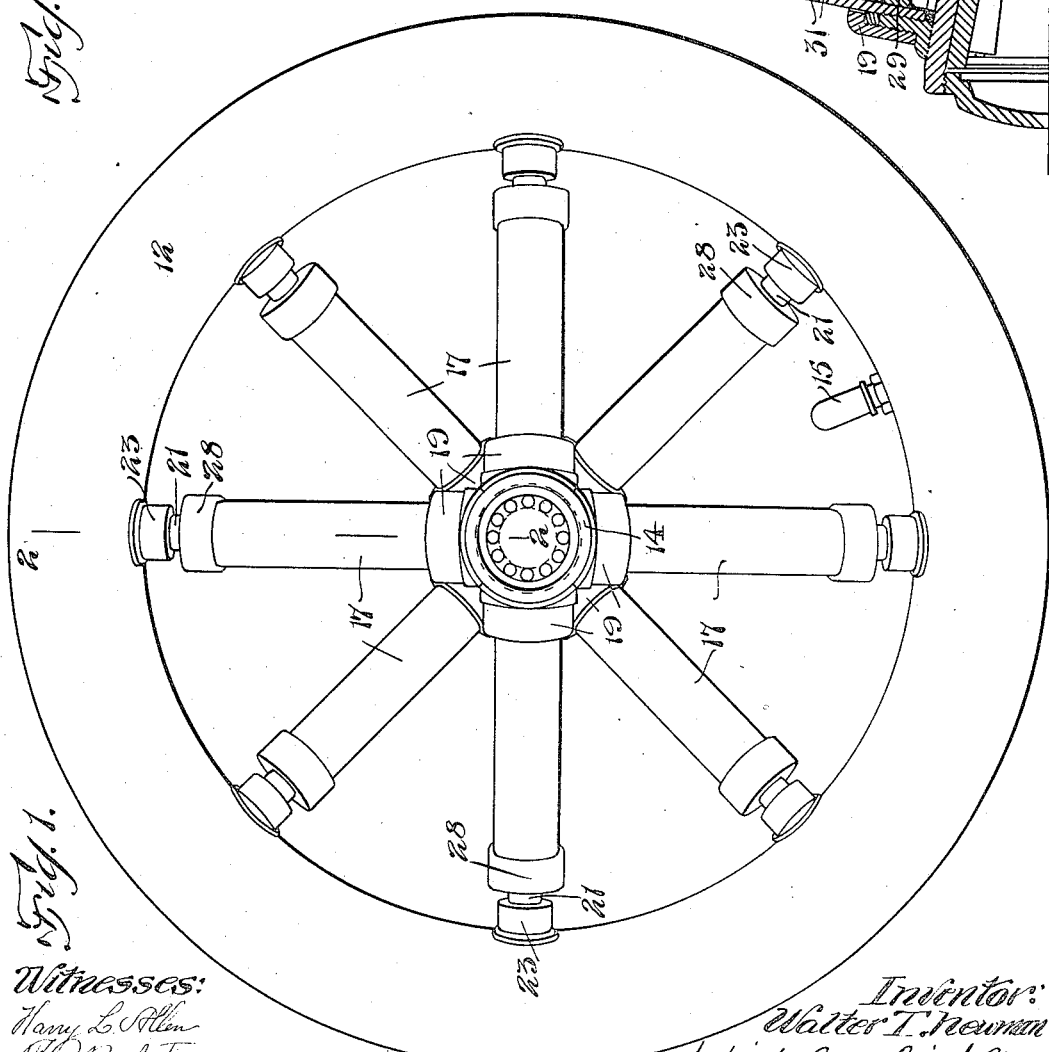

UNITED STATES PATENT OFFICE.

WALTER THOMAS NEWMAN, OF VANCOUVER, BRITISH COLUMBIA, CANADA.

PNEUMATIC WHEEL.

1,195,148.  Specification of Letters Patent.  Patented Aug. 15, 1916.

Application filed December 30, 1910, Serial No. 600,060. Renewed November 10, 1915. Serial No. 60,799.

*To all whom it may concern:*

Be it known that I, WALTER THOMAS NEWMAN, of Vancouver, British Columbia, Dominion of Canada, have invented certain new and useful Improvements in Pneumatic Wheels, of which the following is a specification.

This invention relates to wheels the treads of which are cushioned by air under pressure, and it has for its object to practically eliminate rubber and its compounds in the construction of such wheels and the tread portions thereof, and to produce a wheel which may be made wholly of steel and at the same time possess all the resiliency afforded by ordinary pneumatic tires.

The invention consists in the improvements which I will now proceed to describe and claim.

Of the accompanying drawings which form a part of this specification, Figure 1 represents a side elevation of a wheel embodying my invention; and Fig. 2 represents a section on line 2—2 of Fig. 1.

Similar reference characters indicate the same or similar parts in all the figures.

In the drawings, 12 represents a tubular annular wheel rim made preferably of drawn steel tubing of circular, elliptical, or other suitable form in cross section, and hermetically closed where the ends of the tubing are joined so that the rim constitutes an air reservoir from which air can escape only through air passages 13 formed in the inner side of the rim, said passages communicating with the telescopic spokes hereinafter described. The outer surface of the rim is adapted to serve as the tread portion or tire of the wheel, no tire formed as a separate part being required, although the tread portion of the rim may be covered if desired by a facing, detachable or otherwise, for increasing the traction of the wheel or for other purposes. The hub 14 of the wheel may be of any suitable construction adapting it to rotate on an axle. The rim 12 is connected with the hub by telescopic spokes fully described hereinafter, said spokes permitting the rim to move relatively to the hub edgewise, or in a plane at right angles to the axis of the wheel.

Each spoke comprises an inner member affixed to the hub, and an outer member affixed to the rim, one of said members being chambered to receive and permit the endwise movement of the other member, the chambered member being hereinafter referred to as the "cylinder" member and the other as the "piston" member. The use of the term "cylinder" is not intended to limit me to a chambered member of cylindrical form, although that form is shown in the drawings and is the preferred form.

The spoke member attached to the rim has an air passage which communicates with one of the air passages 13 (there being a passage 13 for each spoke) and with the inner end of the spoke member attached to the hub.

While each spoke member has a sliding fit in the complemental spoke member, means are provided for preventing the passage of air from the interior of the spoke excepting by way of the passage 13, the construction and arrangement being such that air forced under pressure into the rim through a suitable inflating valve 15 not only fills the rim but also the several spokes, and cannot escape from any part of the wheel, consequently the air which finds its way to the inner ends of the spokes acts to yieldingly support or cushion the spoke members attached to the rim and through these the rim itself, the spokes acting as dash pots.

I will now describe the preferred construction of one of the spokes and the preferred means of attaching the same to the hub and rim, it being understood that the spokes are all of the same construction, and all attached in the same way to the hub and rim.

16 represents an outwardly projecting tubular nut or nipple attached to the hub and threaded internally and externally.

17 represents the cylinder member of the spoke which is externally threaded at its inner end and engaged with the internal thread of the nipple 16.

18 represents a collar rigidly attached to the member 17, and bearing on the outer end of the nipple.

19 represents a flanged coupling nut engaged with the external thread of the nipple and bearing on the collar 18. The member 17 is thus detachably secured to the hub.

20 represents an inwardly projecting tubular nut or nipple attached to the inner side of the rim and threaded internally and externally.

21 represents the piston member which is a tube open from end to end, its interior constituting an air passage connecting the air passage 13 in the rim with the inner end of the cylinder member 17. The piston member 21 is externally threaded at its outer end portion, and is engaged with the internal thread of the nipple 20. The piston member has a rigidly attached collar 22, bearing on the outer end of the nipple 20.

23 represents a flanged coupling nut engaged with the external thread of the nipple 20, and bearing on the collar 22. The piston member is thus detachably secured to the rim.

24 represents a compressible washer interposed between the outer end of the piston member and the surface of the rim surrounding the passage 13, and preventing leakage of air between the piston member and the nipple 20.

The cylinder member 17 is provided with a rigid internal collar 25 near its outer end which supports a series of compressible packing rings 26 against the pressure of a gland 27 which is provided with an internally threaded flange 28 engaged with an external screw thread on the outer end portion of the cylinder member 17. Means equivalent to a stuffing box are thus provided for preventing leakage of air between the piston member and the outer end of the cylinder member.

The piston member is provided with rigidly attached collars 29 and 30 located within the cylinder member, the collar 30 being internally threaded and engaged with an external thread on the piston member. Compressible packing rings 31 are interposed between the collars 29 and 30, and serve to prevent leakage of air between the piston member and the inner end of the cylinder member.

It will now be seen that a charge of compressed air forced into the rim is adapted to move freely around the same and into each spoke, the rim constituting a reservoir communicating through the passages 13 with the spokes. The air at the inner or dead ends of the spokes forms a series of cushions yieldingly supporting the piston spoke members and, through the latter, the rim, the air cushions acting in the same way as in the well known pneumatic door check. The harder the shock or blow tending to cause relative movement of the rim and hub, the more quickly the air cushions will act in preventing jars to the body of the vehicle.

It will be apparent that if the spokes were all in the same plane, endwise play or movement of the outer spoke members relatively to the inner spoke members would be prevented because of the different angles of the spokes relatively to each other. I overcome this difficulty by arranging the spokes in two series, each dished outwardly as shown by the drawings, the spokes of one series being dished toward the outer side of the wheel while the spokes of the other series are dished toward the inner side of the wheel. The spokes of each series alternate with those of the other series. This arrangement of the spokes not only gives the wheel the greatest possible resistance to side thrust tending to displace the spokes, but also allows a small but sufficient play of the piston members in the cylinder members without loss of rigidity or opposition to side thrust. The required endwise play of the piston members is very slight because each spoke responds instantaneously to every shock or blow, the force being instantaneously divided by the total number of spokes. Thus a blow of sufficient force to cause a movement of half an inch of a single piston member, which is considerably more than takes place at any time, distributed through, say eight spokes, causes each piston to move but one-sixteenth of an inch.

The described means for preventing leakage of air insures the holding of the charge of air in the rim and spokes under compression, the material of which the washer 24 and packing rings 26 and 31 are composed, being self lubricating, and compressed to a greater degree than the contained air ever reaches, so that the structure is air tight under all essential conditions.

Each spoke is preferably provided with an emergency spring 33 seated on the collars 25 and 29 and adapted to cushion the piston members and rim in case of leakage of compressed air, sufficient to prevent the described pneumatic cushioning action. The spring 33 enables the wheel to run at a decreased speed without loss of resilience.

34 represents a compressible packing ring interposed between the hub and the inner end of the cylinder member, and 35 represents a similar packing ring interposed between the gland 27 and the outer end of the piston member.

Steel or any other suitable metal or metals may be employed in the construction of the wheel.

I claim,—

1. A resilient wheel comprising a hub, a tubular rim of practically rigid construction constituting an annular air reservoir adapted to hold air under pressure, and movable relatively to the hub, and telescopic spokes connecting the hub and rim and composed of chambered members attached to one of said parts and piston members attached to the other part and having an air tight sliding fit in the chambered members, means being provided for the passage of air from the rim to the inner portions of the spokes and from the spokes to the rim whereby the air at the inner ends of the spoke cushions and is caused to yieldingly support the rim through the spoke members attached thereto.

2. A resilient wheel comprising a hub, a tubular rim of practically rigid construction constituting an annular air reservoir adapted to hold air under pressure, and movable relatively to the hub, and telescopic spokes connecting the hub and rim and composed of inner members attached to the hub and formed as cylinders, and outer members attached to the rim and formed as pistons having an air tight sliding fit in the inner members, means being provided for the passage of air from the rim to the inner ends of the inner members and from said inner ends to the rim, whereby compressed air contained in the rim and spokes is caused to yieldingly support the outer spoke members and the rim.

3. A resilient wheel comprising a hub, a tubular rim of practically rigid construction constituting an annular air reservoir adapted to hold air under pressure, and movable relatively to the hub, and telescopic spokes connecting the hub and rim and composed of chambered members attached to one of said parts and piston members attached to the other part and having an air tight sliding fit in the chambered members, means being provided for the passage of air from the rim to the inner portions of the spokes and from the spokes to the rim, whereby the air at the inner ends of the spoke is caused to yieldingly support the rim through the spoke members attached thereto, the spokes being arranged in two oppositely dished series.

4. A resilient wheel comprising a hub, a tubular rim of practically rigid construction constituting an annular air reservoir adapted to hold air under pressure, and movable relatively to the hub, and telescopic spokes connecting the hub and rim, each spoke being composed of a cylinder member rigidly attached to the hub, a piston member rigidly attached to the rim having an air tight sliding fit in the cylinder member, and an air passage communicating with the rim and with the inner end of the cylinder member, whereby compressed air is permitted to flow between the rim and the inner end of the cylinder member to cushion the piston members and rim.

5. A resilient wheel comprising a hub, a tubular rim of practically rigid construction constituting an annular air reservoir adapted to hold air under pressure, and movable relatively to the hub, outwardly projecting coupling parts attached to the hub, inwardly projecting coupling parts attached to the rim, cylindrical spoke members detachably secured to the coupling parts on the hub, piston spoke members detachably secured to the coupling parts on the rim, each piston member having an air tight sliding fit in the cylinder member and an air passage communicating with the rim and with the inner end of the cylinder member.

6. A resilient wheel comprising a hub, a tubular rim of practically rigid construction constituting an annular air reservoir adapted to hold air under pressure, and movable relatively to the hub, outwardly projecting coupling parts attached to the hub, inwardly projecting coupling parts attached to the rim, cylindrical spoke members detachably secured to the coupling parts on the hub, piston spoke members detachably secured to the coupling parts on the rim, each piston member having an air passage communicating with the rim and with the inner end of the cylinder member, and compressible packings carried by the piston members and the cylinder members for preventing leakage of air between said members.

7. A resilient wheel comprising a hub, a tubular rim of practically rigid construction constituting an annular air reservoir adapted to hold air under pressure, and movable relatively to the hub, outwardly projecting externally and internally threaded nipples attached to the hub, inwardly projecting externally and internally threaded nipples attached to the rim, externally threaded cylinder spoke members engaged with the internal threads of the hub nipples and provided with rigid collars bearing on the outer ends of the said nipples, flanged coupling nuts engaged with the external threads of the hub nipples and bearing on said collars, piston spoke members having external threads at their outer ends engaged with the internal threads of the rim nipples, and rigid collars adjacent to their outer ends, flanged coupling nuts engaged with the external threads of the rim nipples and holding said collars against the outer ends of the rim nipples, the piston members being tubular and the rim being provided with air passages communicating with the tubular piston members, compressible washers surrounding said air passages and pressed by the piston members against the rim, the piston members being provided with rigid collars at their inner end portions and with a compressible annular packing between said collars in sliding contact with the inner surfaces of the cylinder members, and the cylinder members being provided with rigid collars at their outer end portions, and with a compressible annular packing between said collars in sliding contact with the external surfaces of the piston members.

8. A resilient wheel comprising a hub, a tubular rim of practically rigid construction constituting an annular air reservoir adapted to hold air under pressure, and movable relatively to the hub, telescopic spokes connecting the hub and rim and composed of chambered members attached to one of said parts, and piston members attached to the other part and having an air tight sliding fit in the chambered members, means being provided for the passage of air from the rim to the inner portions of the spokes and from the spokes to the rim whereby the air at the inner ends of the spoke cushions is caused to yieldingly support the rim through the spoke members attached thereto, and emergency springs seated on the spoke members and adapted to yieldingly support the rim through the spoke members attached thereto.

9. A resilient wheel comprising a hub, a tubular rim of practically rigid construction constituting an annular air reservoir adapted to hold air under pressure, and movable relatively to the hub, telescopic spokes connecting the hub and rim and composed of inner members attached to the rim and formed as pistons, and outer members attached to the hub and formed as cylinders having an air tight sliding fit in the inner members, means being provided for the passage of air from the rim to the inner ends of the inner members and from said inner ends to the rim, whereby compressed air contained in the rim and spokes is caused to yieldingly support the outer spoke members and the rim, said spoke members being provided with collars or spring abutments, and emergency springs interposed between said collars and adapted to yieldingly support the rim through the piston spoke members.

In testimony whereof I have affixed my signature in presence of two witnesses.

WALTER THOMAS NEWMAN.

Witnesses:
   GEO. BROUSSER,
   JOHN A. SUTHERLAND.